(12) United States Patent
Skorina et al.

(10) Patent No.: US 9,340,465 B2
(45) Date of Patent: May 17, 2016

(54) ALKALI METAL ION SOURCE WITH MODERATE RATE OF ION RELEASE AND METHODS OF FORMING

(71) Applicant: Massachusetts Institute of Technology, Cambridge, MA (US)

(72) Inventors: Taisiya Skorina, Cambridge, MA (US); Antoine Allanore, Cambridge, MA (US)

(73) Assignee: Massachusetts Institute of Technology, Inc., Cambridge, MA (US)

(*) Notice: Subject to any disclaimer, the term of this patent is extended or adjusted under 35 U.S.C. 154(b) by 0 days.

(21) Appl. No.: 14/271,042

(22) Filed: May 6, 2014

(65) Prior Publication Data

US 2014/0345348 A1 Nov. 27, 2014

Related U.S. Application Data

(60) Provisional application No. 61/819,699, filed on May 6, 2013.

(51) Int. Cl.
| | |
|---|---|
| C05D 1/00 | (2006.01) |
| C05D 1/02 | (2006.01) |
| C05D 9/00 | (2006.01) |
| C05G 3/00 | (2006.01) |
| C05G 1/00 | (2006.01) |

(Continued)

(52) U.S. Cl.
CPC ............ *C05G 3/0064* (2013.01); *C05D 9/00* (2013.01); *C05D 9/02* (2013.01); *C05G 1/00* (2013.01); *C05D 1/00* (2013.01); *C05D 1/04* (2013.01)

(58) Field of Classification Search
None
See application file for complete search history.

(56) References Cited

U.S. PATENT DOCUMENTS

| 3,137,564 A | 6/1964 | Marx |
| 4,493,725 A | 1/1985 | Moon et al. |
| 4,810,280 A * | 3/1989 | Le Van Mao ....... C01B 33/2815 423/331 |

(Continued)

FOREIGN PATENT DOCUMENTS

| CN | 1064262 A | 9/1992 |
| CN | 1098398 A | 8/1995 |

(Continued)

OTHER PUBLICATIONS

Askegaard, M., et al., "A cation exchange resin method for measuring long-term potassium release rates from soil", *An International Journal on Plant-Soil Relationships* (Kluwer Academic Publishers), 271(1-2): 63-74 (Apr. 1, 2005).

(Continued)

*Primary Examiner* — Wayne Langel
(74) *Attorney, Agent, or Firm* — Hamilton, Brook, Smith & Reynolds, P.C.

(57) ABSTRACT

An alkali metal ion source with a moderate rate of release of the ion (e.g. potassium) is formed by a method that includes: 1) combining an particulate ore that contains at least one of an alkali metal ion-bearing framework silicate (e.g. syenite ore) with at least one of an oxide and hydroxide of at least one of an alkali metal and alkaline earth metal such as calcium hydroxide; 2) milling the mixture of these two components optionally, with water, optionally, milling the dry components separately and blended thereafter, optionally, with water; 3) forming a mixture by adding water to the solid mixture after milling, if water was not added before milling; 4) exposing the mixture to an elevated temperature and pressure to form a gel that includes silica and the alkali metal of the framework silicate.

29 Claims, 9 Drawing Sheets

(51) Int. Cl.
C05D 9/02 (2006.01)
C05D 1/04 (2006.01)

(56) References Cited

U.S. PATENT DOCUMENTS

| | | | |
|---|---|---|---|
| 5,433,766 | A | 7/1995 | Ming et al. |
| 5,695,542 | A | 12/1997 | Chang |
| 5,858,320 | A * | 1/1999 | You .................. A23L 1/237 106/483 |
| 6,887,828 | B2 | 5/2005 | Allen et al. |
| 7,252,697 | B2 | 8/2007 | Liao et al. |
| 2011/0002870 | A1 * | 1/2011 | Costa-Casellas .... A01K 1/0154 424/76.1 |

FOREIGN PATENT DOCUMENTS

| | | |
|---|---|---|
| CN | 1365957 A | 6/2005 |
| CN | 1365958 A | 7/2005 |
| CN | 1508092 A | 4/2007 |
| CN | 101054313 A | 1/2012 |
| CN | 102030338 B | 4/2013 |
| CN | 103172074 | 6/2013 |
| DE | 142802 | 7/1980 |
| EP | 0058922 B1 | 5/1985 |
| FR | 527066 | 10/1921 |
| FR | 556994 | 8/1923 |
| FR | 693074 | 11/1930 |
| GB | 195084 | 3/1923 |
| GB | 342617 | 5/1930 |
| WO | WO 2009/070953 | 6/2009 |
| WO | WO 2013/044016 A2 | 3/2013 |
| WO | WO 2013/061092 A1 | 5/2013 |

OTHER PUBLICATIONS

Bakken, A.K. et al., "Plant available potassium in rocks and mine tailings with biotite, nepheline and K-feldspar as K-bearing minerals", *Acta Argriculturae Scandinavica, Section B—Soil & Plant Science*, 47(3) (1997).

De Vynck, I.A., "Cristallisation Hydrothermale De Gels Alumino-Silicates Et Magnesio-Silicates En Presence D'Hydroxyde De Calcium", Bullet Des Scoietes Chimiques Belges, 88(12): 989-1002 (Jan. 1, 1979).

Liu, Y., et al., "Kinetics of Hydrothermal Decomposition of Potassium Feldspar with Calcium Hydroxide" *Advanced Materials Research*, 549: 65-69 (2012).

Notification of Transmittal of the International Search Report and the Written Opinion of the International Searching Authority mailed Sep. 25, 2014 for International Application No. PCT/US2014/036963 filed May 6, 2014 entitled "Alkali Metal Ion Source With Moderate Rate of Ion Release and Methods of Forming".

Paiste, D., "Reconstituting Feldspar for Fertilizer", MPC Making Matter Matter, [online], [retrieved on Apr. 4, 2014]. Retrieved from the Internet URL: http://mpc-www.mit.edu/component/k2/item/392-reconsituting-feldspar-for-fertilizer.

Qing-Jing, P. et al., "Extraction of potassium from potash feldespare ores with sodium chloride", The Chinese Journal of Process Engineering (Feb. 2002).

Sans Scovino, J.I., and Rowell, D.L., "The use of feldspars as potassium fertilizers in the savannah of Colombia", Fertilizer Research 17: 71-83 (1988).

Terry, B. "The acid decomposition of silicate minerals part I. Reactivities and modes of dissolution of silicates", *Hydrometallurgy*, 10(2), 135-150 (1983).

Tokunaga, Y., "Potassium silicate: a slow-release potassium fertilizer", Fertilizer Research, 30: 55-59 (1991).

van Oss, H.G., "Cement", U.S. Geological Survey Minerals Yearbook (2000); Available at Internet URL: minerals.usgs.gov/minerals/pubs/commodity/cement/170400.

Wang, Z.-B., et al., "Study on extracting potassium from potassium feldspar-NaOH system by hydrothermal method", *Industrial Minerals & Processing*, May 2010.

Wu, L. and Mingzhu, L., "Slow-Release Potassium Silicate Fertilizaer with the Function of Superabsorbent and Water Retention", Industrial & Engineering Chemistry Research, 46(20): 6494-6500 (Sep. 1, 2007).

Han, Xiao-Zhao, et al. "Extraction of potassium from potash feldspar ores with sodium chloride", Industrial Minerals and Processing (Sep. 2005).

Hao, Zhang, et al., "The Extraction of Potassium from Feldspar by Molten Salt Leaching Method with Composite Additives", Advanced Materials Research, 524, 527, 1136 (2012).

Gu, Ying-Ying, et al., "Research on the New Technology of activated roasting-acid leaching of potash feldspar", Multipurpose Utilization of Mineral Resources (Jan. 2012).

Zhang, B. et al., "Study on thermal treatment schedule of leucite microcrystallization to reinforce dental glass ceramics", *Chinese Journal of Stomatology*, 38(2): 143-146 (Mar. 1, 2003).

International Preliminary Report on Patentability issued Nov. 10, 2015 for International Application No. PCT/US2014/036963, entitled "Alkali Metal Ion Source With Moderate Rate of Ion Release and Methods of Forming".

* cited by examiner

K

US 9,340,465 B2

ALKALI METAL ION SOURCE WITH MODERATE RATE OF ION RELEASE AND METHODS OF FORMING

RELATED APPLICATION

This application claims the benefit of U.S. Provisional Application No. 61/819,699, filed on May 6, 2013. The entire teachings of the above application(s) are incorporated herein by reference.

BACKGROUND OF THE INVENTION

There is a growing need for alternative sources of alkali metals, such as, but not limited to, potassium. Potassium chloride (traditional potassium fertilizing agent) is produced in a limited number of geographical locations remote from the southern hemisphere, where the transportation costs contribute to the market price significantly, making local manufacturing of potassium fertilizer increasingly attractive. As human population grows, agriculture also must grow and evolve with it, in particular, in available regions in the southern hemisphere. Among others, modern agriculture development in those regions requires growing crops on soils that are often fully depleted of macronutrients, structural elements, e.g. silicon in a form available for plants (monosilicic acid) or calcium, and structure-developing minerals, such as clay minerals (phylosilicates). In other words, these soils are not optimal for growing crops due to the lack of proper structure and essential elements resources. From the perspective of soil fertilization, traditional fertilizing agents, such as potassium nitrate and potassium chloride, are not optimal due to their excessive leaching, the lack of retention of their corresponding ions, and their inability to provide a proper structure to the soil. Potassium and other nutrition elements introduced into the soil in the form of these highly soluble salts are thus wasted, having potential negative effects on the environment, e.g., chloride contamination. Therefore, new potassium sources and a better means of nutrient delivery are needed to allow high agricultural productivity and expansion in the available regions of the southern hemisphere. Ideally, these sources can simultaneously provide essential elements, such as calcium and plant-available silicon, and promote formation of structural minerals.

Rock-forming minerals, such as potassium feldspars ($KAlSi_3O_8$), may therefore be considered as earth-abundant alternatives to traditional sources based on their relatively high content of $K_2O$ (more than 15 wt % of $K_2O$ in pure $KAlSi_3O_8$). Numerous research efforts dedicated to the extraction of potassium ion ($K^+$) from rock-forming minerals have been conducted in the last decades. Among such proposals are methods for complete disintegration of potassium-bearing silicates and aluminosilicates aimed at extracting $K^+$ in the form of a highly soluble salt, such as, but not limited to, KCl. These extraction methods are typically based on the precipitation of a water-soluble potassium salt from an aqueous solution obtained after disintegration of the raw minerals. The methods of disintegration, in turn, typically employ relatively high temperatures (>1000° C.), or/and aggressive acid-basic treatments, inevitably creating large volumes of liquid and/or solid wastes involving sophisticated and expensive separation techniques. ("*Processing for decomposing potassium feldspar by adopting low-temperature semidry method for comprehensive utilization,*" CN 103172074 A; Hao Zhang, et al. (2012). The Extraction of Potassium from Feldspar by Molten Salt Leaching Method with Composite Additives. Advanced Materials Research, 524-527, 1136; and Pedro Lucas Gervasio Ladiera Potash product and method Patent Application WO 2013061092 A1. The teachings of all of which are incorporated herein by reference in their entirety.)

Attempts to use unaltered stone-meals (crushed rocks) as an alternative source of potassium for fertilizer and a source of plant-available silicon have also been made. (Anne Kjersti Bakken, Harvard Gautneb, Kristen Myhr (1997) Plant available potassium in rocks and mine tailings with biotite, nepheline and K-feldspar as K-bearing minerals. Acta Agriculturae Scandinavica, Section B—Soil & Plant Science. Vol. 47; and Y. Tokunaga, Potassium silicate (1991). A slow-release potassium fertilizer. Fertilizer Research. 30, 55-59. The teachings of all of which are incorporated herein by reference in their entirety.) However, natural chemical weathering of those crushed stone is an extremely slow process, and the benefits such as nutrients release and phylosilicate formation from crushed primary minerals appear only on a timescale that far exceed—several years, potentially decades—the timescale of growth and harvesting of crops of modern agriculture.

Therefore, a need exists to produce a source of potassium ion that releases the nutrient at a moderate rate, lower than the infinite dissolution rate of a traditional salts, but faster than the rate generally exhibited by naturally-occurring minerals. Ideally, this source be produced from the earth abundant K-bearing silicate rocks, can provide structural components (such as silicon in the form of monosilicic acid and/or calcium), and can promote the formation of clay minerals (phylosilicates). Also, a need exists for a method to produce source of such materials that minimizes the above-mentioned problems.

SUMMARY OF THE INVENTION

The invention generally relates to a method for forming an alkali metal ion source and an alkali metal ion source formed by the method.

In one embodiment, a method of the invention for forming an alkali metal ion source includes combining a first component that includes a particulate alkali metal ion-bearing framework silicate with a second component that includes at least one of an oxide and a hydroxide of at least one of an alkaline earth metal and an alkali metal to form a solid mixture. The molar ratio of the silicon of the first component to the at least one of the alkaline earth and alkali metal and alkali metal of the second component is in a range of between about 1.0:0.1 and about 1.0:0.3. The mixture is optionally joint wet milled or dry joint milled, or separately milled and blended after the milling. In the event that the solid mixture is wet joint milled, the total amount of liquid presents is in a ratio by weight of liquid-to-solid in a range of between about 0.05:1 and about 5:1. The mixture is then exposed to elevated temperature and pressure for a period of time sufficient to form a gel that includes the silicon and the alkali metal of the first component, thereby forming the source of alkali metal. The weight ratio of tobermorite phase to the unreacted alkali metal ion-bearing framework silicate phases of the alkali metal ion source can be between about 1:1 and about 0:1. The weight percent of K(Na)-A-S—H gel of the alkali metal ion source can be between about 10% and about 100%. The specific surface area of the alkali metal ion source can be between about 8 $m^2/g$ and 50 $m^2/g$.

In another embodiment of a method of the invention, an alkali metal ion source is formed by reducing the size of a particulate alkali metal ion-bearing framework silicate until at least about 50% by weight of the particles have a diameter of equal to or less than 5 μm as measured by laser diffraction using a laser diffraction particle size analyzer in liquid mode (e.g., in water medium).

In one embodiment, an alkali metal ion source of the invention is formed from a particulate alkali metal ion-bearing framework silicate by a method of the invention, to thereby form the source of alkali metal that contains not less than 10 wt. % of the alkali ion-bearing silicate gel, has a specific surface area (BET) between about 8 m²/g and about 50 m²/g, and releases not less than 1 g of potassium per 1 kg of the alkali metal ion source and not less than 1 wt. % of silica acid within 24 hours upon exposure to aqueous solution that is undersaturated with respect to potassium and silica.

In one embodiment, an alkali metal ion source of the invention is formed from a particulate alkali metal ion-bearing framework silicate by a method of the invention, to thereby form the source of alkali metal having Brunauer-Emmett-Teller (BET) specific surface area between about 3 m²/g and about 10 m²/g.

This invention has many advantages. For example, the method of the invention of forming an alkali metal ion source from a potassium-bearing rock does not require strong acids or an excessive amount of liquid and can be performed at relatively moderate temperatures (≤350° C.). The method of the invention also enables control over the rate of release of the alkali metal from the final product without requiring sophisticated intermediate steps by tailoring the amount of gel formed relative to other components bearing the alkali metal ion of the particulate alkali metal ion-bearing framework silicate. Also, the release of potassium from the product is accompanied by the introduction to the soil of the entities that constitute the gel (siliceous acid and aluminum hydroxide) and precipitation of them in a secondary phase beneficial for soil (mainly, phylosilicates). This provides several key elements in a single material and the necessary structural components for the soils in the manner described above. Further, the method of the invention avoids the formation of solid and liquid wastes that would otherwise need to be separated, recycled, and stockpiled before use of the product, such as where the product is used as a fertilizer.

The composition and structure of the material of the invention permits the tuning of the soil composition by the controllable release of the essential elements. For example, in the case of highly acidic soils (pH<5), pH can be safely raised by calcium ions released from the product. Moreover, the presence of tobermorite phase prevents complete release of calcium ions, which can thereby prevent the soil pH from rising above 7. Silicate gel provides plant-available silicon, which is a structural and defensive element for many plants, in a form of monomers and low-weight oligomers of silicic acid, which also participates in phylosilicate phase precipitation in-situ. The moderate rate of potassium release prevents potassium from being immediately drained away with irrigation. Original phases, when contained in the product, allows colonization of plant roots and long term slow release of all its entities.

DETAILED DESCRIPTION OF THE INVENTION

Figure 1:
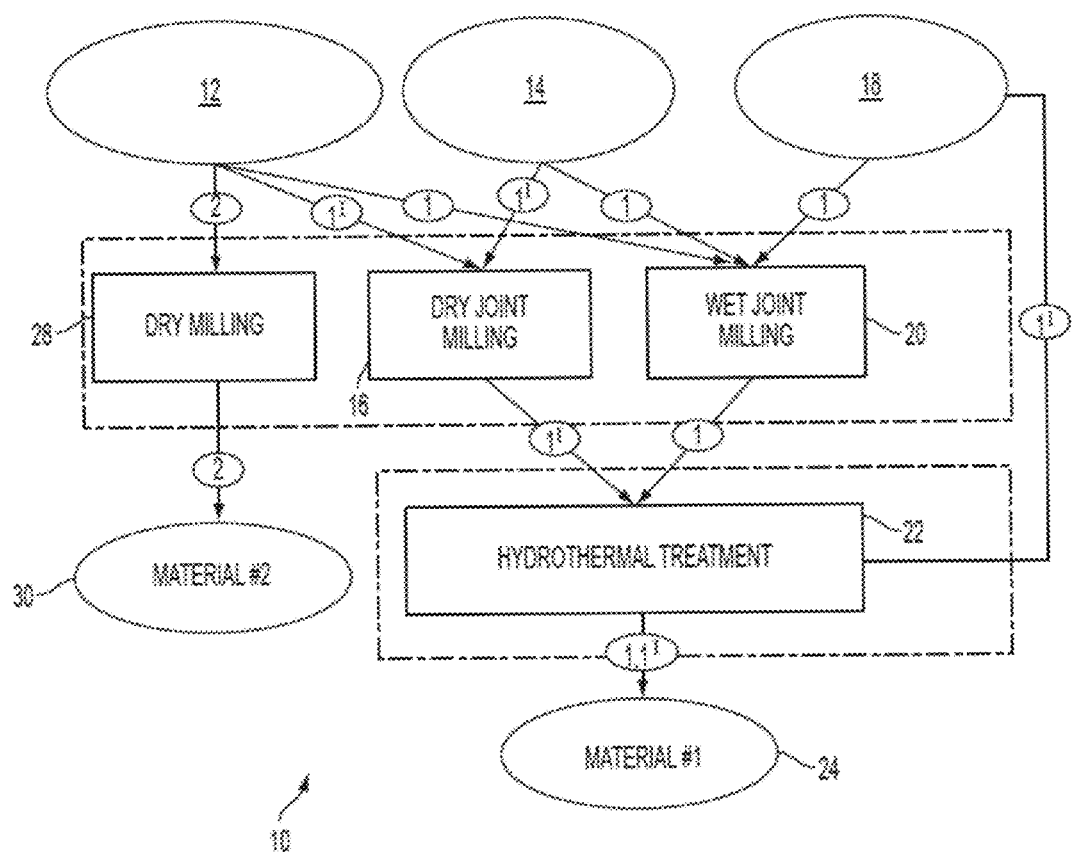
FIG. 1 is a schematic representation of the sequence of steps of certain embodiments of the method of the invention to produce embodiments of products of the invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The invention generally is directed to a method for forming an alkali metal ion source and a metal ion source formed by the method of the invention. The alkali metal ion source of the invention has many uses, such as where the alkali metal is potassium, a fertilizer for growing crops. FIG. 1 is a schematic 10 representing certain embodiments of the method of the invention. The steps of three possible embodiments of the method of the invention are represented in FIG. 1 as "1" for "Process 1," "1$^b$" for "Process 1$^b$" and "2" for "Process 2." First component 12 shown in FIG. 1 is a particulate alkali metal ion-bearing framework silicate. It is to be understood that "silicate" in the phrase "particulate alkali metal ion-bearing framework silicate" includes aluminosilicates.

In one embodiment of the method of the invention represented in FIG. 1, first component 12 is formed from a suitable ore containing the alkali metal that is reduced in size by a suitable method known to those skilled in the art, such as crushing. For example, a suitable ore can be reduced in particle size to a mean particle size of equal to or less than about 5 mm, as measured by, for example, sieve analysis. (ASTM C136-06 Standard Test Method for Sieve Analysis of Fine and Coarse Aggregates, the teachings of which are incorporated herein by reference in their entirety). Examples of suitable alkali metals for use in the method of the invention to produce the alkali metal ion source include, for example, at least one member of the group consisting of lithium (Li), sodium (Na) and potassium (K). An example of a suitable source of lithium includes petalite ($LiAlSi_4O_{10}$). Examples of suitable sources of sodium include albite ($NaAlSi_3O_8$) and nepheline ($Na_3KAl_4Si_4O_{16}$). Examples of suitable sources of potassium include potassium feldspar ($KAlSi_3O_8$), leucite ($KAlSi_2O_6$), kalsilite ($KAlSiO_4$), and nepheline ($Na_3KAl_4Si_4O_{16}$). Examples of suitable sources of the potassium include ores, such as syenite, nepheline syenite, and granite.

In a particularly preferred embodiment, the alkali metal is potassium, and the preferred alkali metal ion-bearing framework silicate is potassium feldspar ($KAlSi_3O_8$) wherein the suitable ore contains at least about 5% by weight of an equivalent amount of potassium oxide ($K_2O$).

In one embodiment, the second component includes at least one of an alkali metal and an alkaline earth metal. Preferably, the alkaline earth metals of second component 14 includes at least one member of the group consisting of beryllium (Be), magnesium (Mg), calcium (Ca), and strontium (Sr). Preferably, the alkaline earth metal of the second component includes calcium. Most preferably, the alkaline earth metal of the second component is combined with the first component when the alkaline earth metal is in the form of calcium oxide (CaO) or calcium hydroxide (Ca(OH)$_2$).

In another embodiment, the second component includes an alkali metal. Preferably, the alkali metal of the second component includes at least one member of the group consisting of lithium (Li), sodium (Na), and potassium (K).

In one embodiment, the molar ratio of the silicon of first component 12 to the at least one of an alkaline earth metal and an alkali metal of second component 14 is in a range of between about 1.0:0.1 and about 1.0:0.3. In a preferred embodiment, second component 14 includes calcium as an alkaline earth metal element of second component 14 in the form of calcium oxide or calcium hydroxide. Based on the amount of calcium oxide present in the solid mixture of first component 12 and second component 14, the concentration of calcium oxide preferably is in a range of between about 5% and about 30% by weight of the combined first and second components.

In Process 1, first component 12 is combined with second component 14 and liquid water 18 to form a mixture of liquid and solid. In one embodiment, the amount of liquid water present is in a ratio by weight of liquid-to-solid of the liquid-and-solid mixture in a range of between about 0.05:1 and about 5:1, preferably, in a range of between about 2:1 and about 3:1.

In a preferred embodiment, the combined liquid and solid mixture is wet joint milled 20 to thereby reduce the mean particle size of the particulate alkali metal ion-bearing framework silicate until the weight percent of the particles of the particulate alkali metal ion-bearing framework silicate having a diameter of 5 μm or less is at least about 50%. Milling of the liquid and solid mixture is preferred, but optional. Alternatively, the solid and liquid mixture can be treated hydrothermally as described below, with first conducting a wet joint milling step.

The liquid-and-solid mixture is hydrothermally treated 22 by exposure to an elevated temperature and pressure to thereby form an alkali metal ion-bearing silicate gel, a key component of "Material #1" 24. The gel includes the alkali metal of the first component, thereby forming the alkali metal ion source. In a preferred embodiment, the liquid-and-solid mixture is exposed to both a temperature in the range of between about 100° C. and about 350° C., and a pressure of between about 100 PSIG (pound force per square inch gage) and about 500 PSIG to thereby form the alkali ion-bearing silicate gel. In a specific embodiment, the liquid-and-solid mixture is exposed to the elevated temperature and pressure until essentially all of the alkali metal of the first component is present as a component of the silicate gel.

In Process 1$^I$, also represented in FIG. 1, first component 12 is combined with second component 14 to form a solid mixture and optionally dry milled 16. In Process 1$^I$, second component 14 includes at least one of an oxide and a hydroxide of at least one of an alkali metal and an alkaline earth metal. Optionally, the alkali metal of second component 14 can be the same as the alkali metal of first component 12.

The solid mixture of Process 1$^I$ is then hydrothermally treated as in Process 1, but with additional water 18, as necessary, to thereby obtain the same ratio by weight of liquid-to-solid as in Process 1. As in Process 1, hydrothermal treatment 22 causes formation of an alkali ion-bearing silicate gel, a key component of Material #1 (24).

In one embodiment, the Material #1 formed by the method of Process 1 or Process 1$^I$ of the invention is combined with soil to form a mixture. Preferably, the weight ratio of silicate gel-to-soil is in a range of between about 0.0001:1 and about 0.01:1.

In another embodiment, a method of the invention represented in FIG. 1 as "Process 2," includes forming an alkali metal ion source by reducing the size of a particulate alkali metal ion-bearing framework silicate by dry milling 28 until at least about 50% by weight of the particles have a diameter of equal to or less than about 5 μm, as measured by laser diffraction using a Laser Diffraction Particle Size Analyzer in liquid mode (water), to thereby form "Material #2" 30. Examples of suitable methods of reducing the size of the particulate alkali metal-ion bearing silicate framework include ball milling and micronizing. Examples of suitable sources of particulate alkali metal ion-bearing framework silicate for use with this embodiment of the method are as described above. In a preferred embodiment, the particulate alkali metal ion-bearing framework silicate is an ore, such as syenite including, for example, nepheline syenite, and granite, and a preferred method of reducing the size of the syenite includes wet ball milling.

In one embodiment, the invention is an alkali metal ion source formed from a particulate alkali metal ion-bearing framework silicate by a method of the invention. Examples of suitable particulate alkali metal ion-bearing framework silicates from which the alkali metal ion source with moderate rate of ion release of the invention is derived are as listed above. In one embodiment, the alkali metal ion source is derived from potassium feldspar and has Brunauer-Emmett-Teller (BET) specific surface area in a range of between about 8 m$^2$/g and about 50 m$^2$/g, and micropore specific surface area (the surface area of pores, cavities, and defects with the width of 4 to 20 Å) in a range of between about 1 m$^2$/g and about 10 m$^2$/g.

The following examples are provided as embodiments of the present invention and are not necessarily limiting.

EXEMPLIFICATION

Mechano-Hydrothermal Alteration of
Potassium-Bearing Rock-Forming Minerals

The following non-limiting examples of two embodiments of products of the invention (Material #1 and Material #2), and of industrially ball-milled mineral powders are presented in Tables I and II. In accordance with the present invention, Table I reports examples of mixtures of chemical (in oxides) and mineral (phase) compositions of the initial mineral (syenite ore), and the compositions of products ultimately formed. Table II reports some of the physical properties of products of the invention formed from the mixtures described in Table I.

Examples 10 g of roughly ground raw material (ground syenite ore with rough irregular crystalline particles with the size <5 mm) and the composition listed in table I was mixed with dry powdered Ca(OH)$_2$ (Sigma-Aldrich, grade: ≥96.0%≤3.0% calcium carbonate) for 5-10 minutes before addition of water. Distilled water was added to the mixture according to the proportion listed in Table I. The suspension was placed into the chamber of a McCrone Micronising Mill by McCrone Microscope & Accessories of Westmount, Ill., and milled for 30 minutes (weight ratio between the milling elements (agate spheres) and the sample was about 4). After milling, the suspension was transferred to a batch pressure vessel commercially available from Parr Instrument Co., of Moline, Ill. and maintained at a temperature of about 200° C. and pressure of about 225 PSIG for about 24 hours without stirring. After the reaction, a resulting solid phase containing residual liquid was dried overnight at about 110° C. The ultimate compositions of the material are listed as Examples 1, 2 and, 3 in Table I. Examples 4, 5 and 6 of Table I, were obtained by sole dry milling. Milling was performed in the McCrone Micronizing Mill; the weight ratio between milling elements and mineral sample was about 67. This milling did not have a noticeable effect on the phase composition, but provided beneficial effects favoring increased rates of potassium release, including an increase in available surface area, volume of ultra-fine particles and introduction of crystal lattice disturbances. Example 7 (control samples in the experiment) was prepared by sole industrial ball milling from the same syenite ore as Examples 1, 2, and 3. Example 8 (control sample in the experiment) was prepared by sole industrial ball milling from the same syenite ore as the examples the Examples 4, 5, and 6. The milling parameters are listed in Table I, and the properties of the materials obtained are listed in Table II. The following analytical techniques were used to characterize key material properties and the performance:

The Specific Surface Area according to Brunauer-Emmett-Teller (SSA-BET) was determined for each of the synthesized samples. The analysis was performed with a surface area and porosity analyzer using nitrogen as the adsorbing gas. In this study, nitrogen sorption isotherms were collected at a Micrometric ASAP 2020 Surface area and Porosity Analyzer, available from Micrometrics Co., Norcross, Ga., at 77 K. Samples were degassed under low vacuum at 110° C. for ~24 hours. The SSA calculation under the Brunauer-Emmett-Teller (BET) model was applied to the absorption branch of the isotherm. For the estimation of the area of micropores (area of pores and surface roughness with the width of 4-20 Å), a T-Plot model was applied.

Particle Size Distribution (PSD) analysis was performed for powder samples by the laser diffraction method using a Laser Diffraction Particle Size Analyzer LS 13 320 (Beckman Coulter, Inc.) in liquid mode (in water medium). The diffraction pattern was obtained after preliminary sonication of the suspension aimed at avoiding random error caused by aggregation.

Phase composition by powder X-Ray diffraction: Powder X-ray diffraction patterns of the samples before and after leaching experiments were obtained using PANalytical X'Pert Pro Diffractometer, available from PANalytical, Co. A scan rate 150 sec/step and incident/diffracted beam optics recommended for a slow scans of complex poorly crystallized samples was used. The phase composition of crystalline part and the amount of amorphous part (K(Na)-A-S—H gel) in the Material #1 were determined by quantitate line-profile analysis of XRD-patterns performed using High-Score plus software available from PANalytical, Co.

The microstructure of the materials was studied by scanning electron microscopy (SEM) and transmission electron microscopy (TEM). A Scanning Electron Microscopy (SEM) investigation was carried out using a JEOL 6610LV microscope available from JEOL USA, Inc. both in low-vacuum (30 Pa) and high-vacuum ($<10^{-3}$ Pa) modes. In the high-vacuum mode, a 15-20 kV accelerating voltage, 40-50 spot size, and 1015 mm working distance were used for imaging Secondary Electrons imaging (SE) to study the microtexture of the grains, and to observe surface roughness, topography, inclusions, and porosity at the micron-/submicron-scale. Natural defects and "man-made" defects caused by commination were best distinguished in this mode. A Back-Scattered Electrons imaging (BSE) was used to observe various phases based on atomic number in order to correlate grain size, shape and their mineralogy (if possible). Energy dispersive X-ray analysis (EDX) was used for compositional mapping.

Nutrition elements release (materials performance) was studied as following. "Short term K-release cumulative value" of Table II corresponds to the sum of grams (g) of potassium (K) released in 3 batches from Material #1, Material #2 and the two controls—Examples 7 and 8 with fresh solution of pH=5 performed within 24 hours (solid-to-liquid weight ratio=1:10, pH of influent=5, t=22° C.). "Mid-term K-release cumulative value" of Table II corresponds to the sum of grams of potassium released in 10 batches (each batch is replacing of old influent by fresh influent keeping the same solid-to-liquid ratio) performed within 10 days (solid to liquid weight ratio=1:10, pH of influent=5, t=22° C.). The concentration of elements in the effluent was measured by use of an inductively-coupled plasma mass spectrometer provided by Agilent Technologies, Inc., USA. Release of such elements as calcium Ca and Si was analyzed by the same method employed to measure the rate of release of K.

TABLE I

| | Material #1 | | | Material #2 | | | Industrially ball-milled powders | |
|---|---|---|---|---|---|---|---|---|
| | \multicolumn{8}{c}{Example Number} |
| | 1 | 2 | 3 | 4 | 5 | 6 | 7 | 8 |
| | \multicolumn{8}{c}{Initial mineral (Syenite ores) Chemical Composition, wt. %} |
| $SiO_2$ | | 62.4 | | | 62.9 | | 62.4 | 62.9 |
| $Al_2O_3$ | | 17 | | | 17.3 | | 17 | 17.3 |
| $Fe_2O_3$ | | 2.18 | | | 1.9 | | 2.18 | 1.9 |
| CaO | | 1.31 | | | 1.13 | | 1.31 | 1.13 |
| MgO | | 0.65 | | | 0.39 | | 0.65 | 0.39 |
| $TiO_2$ | | 0.16 | | | 0.19 | | 0.16 | 0.19 |
| $P_2O_5$ | | 0.17 | | | 0.123 | | 0.17 | 0.123 |
| $Na_2O$ | | 0.7 | | | 1.85 | | 0.7 | 1.85 |
| $K_2O$ | | 14.3 | | | 12.6 | | 14.3 | 12.6 |
| MnO | | <0.1 | | | <0.1 | | <0.1 | <0.1 |
| BaO | | 0.72 | | | 1.17 | | 0.72 | 1.17 |
| LOI | | 0.11 | | | 0.19 | | 0.11 | 0.19 |

TABLE I-continued

|  | Material #1 | | | Material #2 | | | Industrially ball-milled powders | |
|---|---|---|---|---|---|---|---|---|
| | | | | Example Number | | | | |
| | 1 | 2 | 3 | 4 | 5 | 6 | 7 | 8 |
| Phase composition | | | | | | | | |
| Microcline + Orthoclase | | 94.5 | | | 80 | | 94.5 | 80 |
| Albite | | 1.5 | | | 11 | | 1.5 | 11 |
| Pyroxene | | 4 | | | 9 | | 4 | 9 |
| Chemical composition of ultimate material produced | | | | | | | | |
| $SiO_2$ | 52.0 | 54.7 | 57.7 | The same as the chemical composition of the initial mineral described in the upper rows of this table - no chemical modification applied | | | | |
| $Al_2O_3$ | 14.2 | 14.9 | 15.7 | | | | | |
| $Fe_2O_3$ | 1.81 | 1.91 | 2.0 | | | | | |
| CaO | 15.3 | 11.14 | 6.5 | | | | | |
| MgO | 0.54 | 0.57 | 0.60 | | | | | |
| $TiO_2$ | 0.13 | 0.14 | 0.15 | | | | | |
| $P_2O_5$ | 0.14 | 0.15 | 0.16 | | | | | |
| $Na_2O$ | 0.58 | 0.61 | 0.65 | | | | | |
| $K_2O$ | 11.9 | 12.53 | 13.2 | | | | | |
| MnO | <0.1 | <0.1 | <0.1 | | | | | |
| BaO | 0.60 | 0.63 | 0.67 | | | | | |
| LOI | 2.8 | 2.73 | 2.64 | | | | | |
| Liquid/Solid ratio | | 3 | | | | | n/a | |
| Milling time, min | | 30 | | 10 | 30 | 60 | 37 | 55 |
| Stirring | | no | | | | | n/a | |
| Max T, °C.; P, psig | | 200; 225 | | | | | | |
| Hold time, hours | | 24 | | | | | | |

TABLE II

|  | Material #1 | | | Material #2 | | | Industrially ball-milled powders | |
|---|---|---|---|---|---|---|---|---|
| | | | | Example Number | | | | |
| | 1 | 2 | 3 | 4 | 5 | 6 | 7 | 8 |
| Phase composition of final material | | | | | | | | |
| Weight ratio between Tobermorite/(Microcline + Orthoclase)** | 0.125:1 | 0.09:1 | 0.05:1 | | | | 0:1 | |
| K(Na)-A-S-H gel, wt. %*** | 20-25 | 15-20 | 10-15 | | | | 0 | |
| Surface Specific Area (SSA-BET) | 12 | 9 | 8 | 4.4 | 8 | 8 | 1.4 | 2.7 |
| Micropores T-Plot Area | 2.6 | 4.2 | 3.1 | 0.3 | 0.4 | 0.5 | 0.1 | 0.1 |
| 90 volume % below the size (μm) | | 500 | | 18 | 12 | 12 | 30 | 56 |
| Volume % of particles below 5 μm | | 30 | | 56 | 70 | 72 | 23 | 30 |
| Cumulative release of nutrition elements (g of element/kg of dry sample) | | | | | | | | |
| Short Term K-release (24 hours) | 10 | 5.6 | 2.0 | 0.4 | 0.6 | 0.8 | 0.2 | 0.2 |
| Mid Term K-release (30 days) | 12 | 6.5 | 2.5 | 0.7 | 1.0 | 1.3 | 0.5 | 0.3 |
| Mid Term Ca-release (30 days) | 0.48 | 0.53 | 0.75 | | | <0.1 | | |
| Mid Term Si-release (30 days) | 1.23 | 1.03 | 0.77 | 0.38 | 0.40 | 0.50 | 0.31 | 0.23 |

*X-Ray diffraction analysis revealed that all examples of the material #1, both before and after batch leaching experiments shows the presence of Tobermorite-11 Å, a crystalline compound with general formula $Ca_5Si_6O_{16}(OH)_2 \cdot nH_2O$* where n ~4.
**Two phases that represent K-Feldspar that initially contained in the syenite ore. The general formula both for microcline and orthoclase is $KAlSi_3O_8$.
***Following the IUPAC, a "gel" is defined as a non-fluid colloidal network or polymer network that is expanded throughout its whole volume by a fluid. An aluminosilicate gel contains an inorganic colloidal or polymer network of $[SiO_4]^{4-}$ and $[AlO_4]^{5-}$ clusters. Charge-balancing ions of alkali metals are distributed along the random framework.

Figure 2:
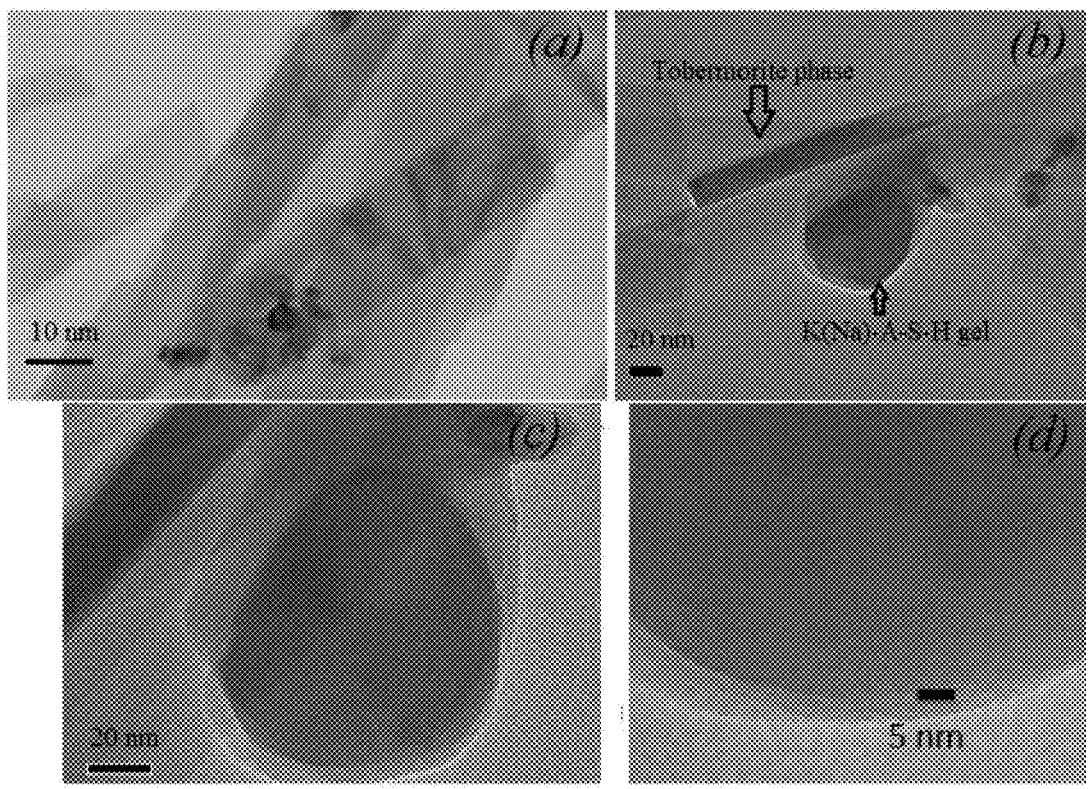
FIGS. 2A through 2D are transmission electron microscopy (TEM) images showing an amorphous component (gel) co-formed and stabilized along with a tobermorite phase in one embodiment of a product of the invention, referenced as Material #1.
Figure 3A:
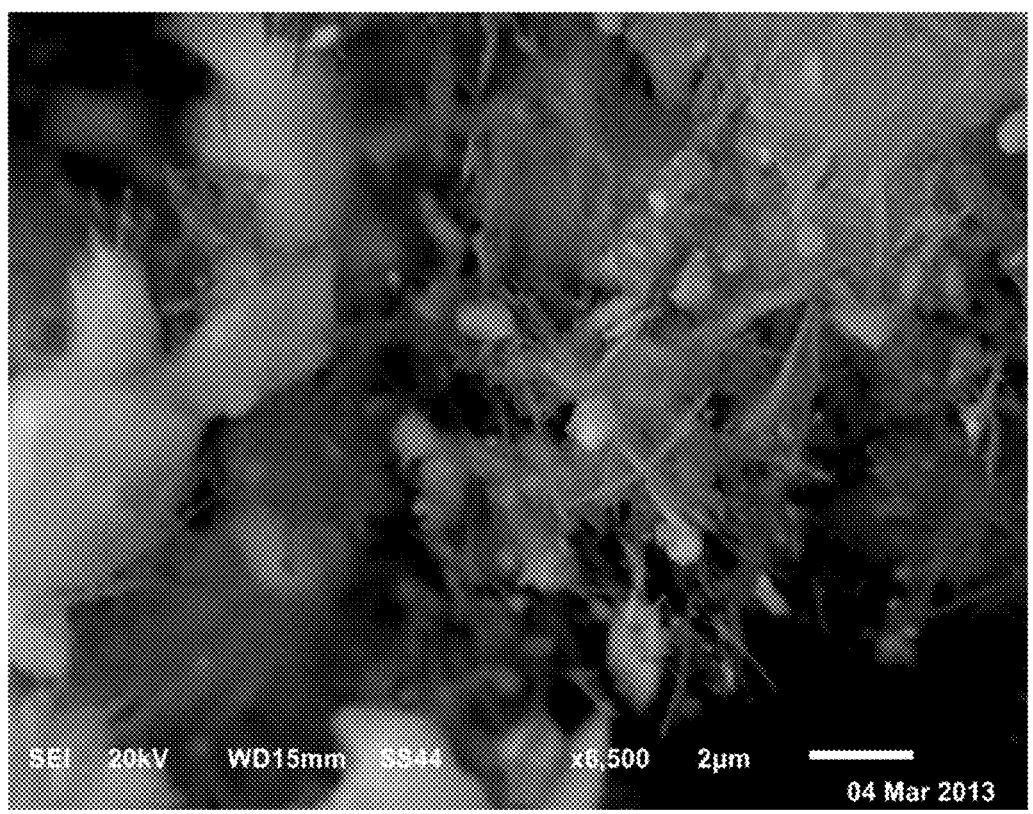
FIGS. 3A through 3D are secondary electron images of one embodiment of an embodiment of the invention.
Figure 3B:
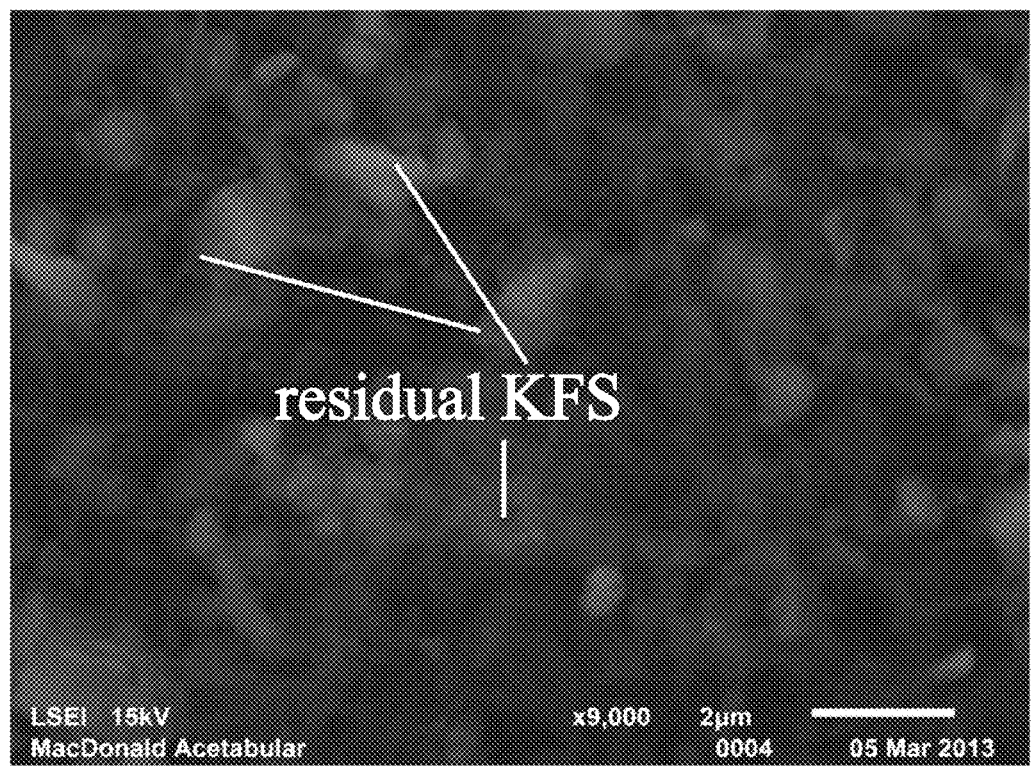
Figure 3C:
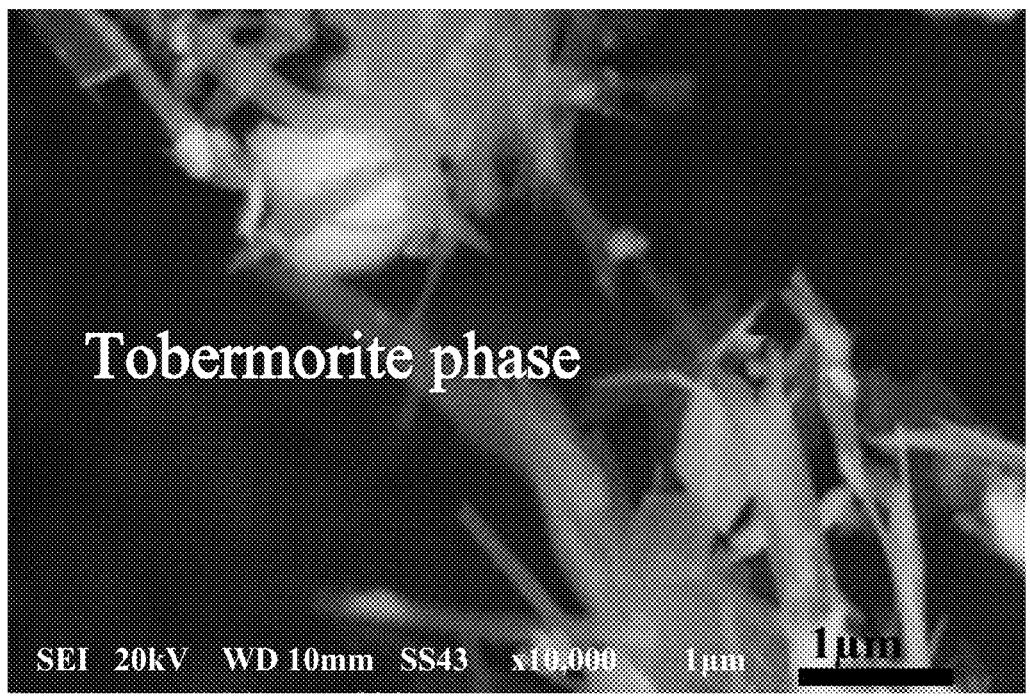
Figure 3D:
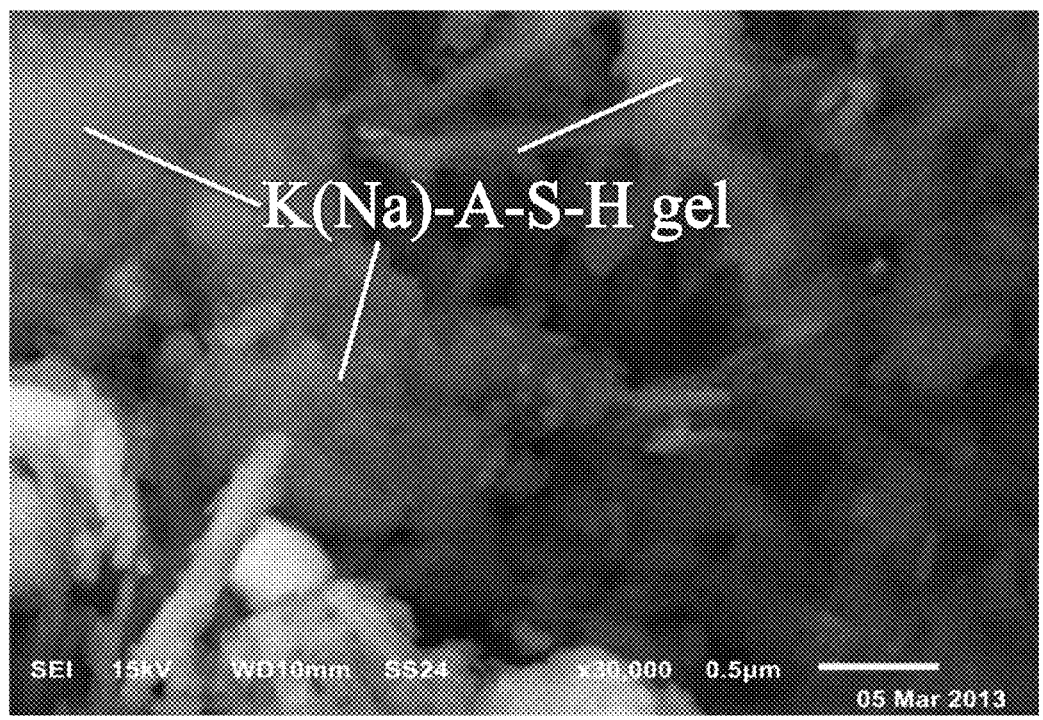
Figure 4:
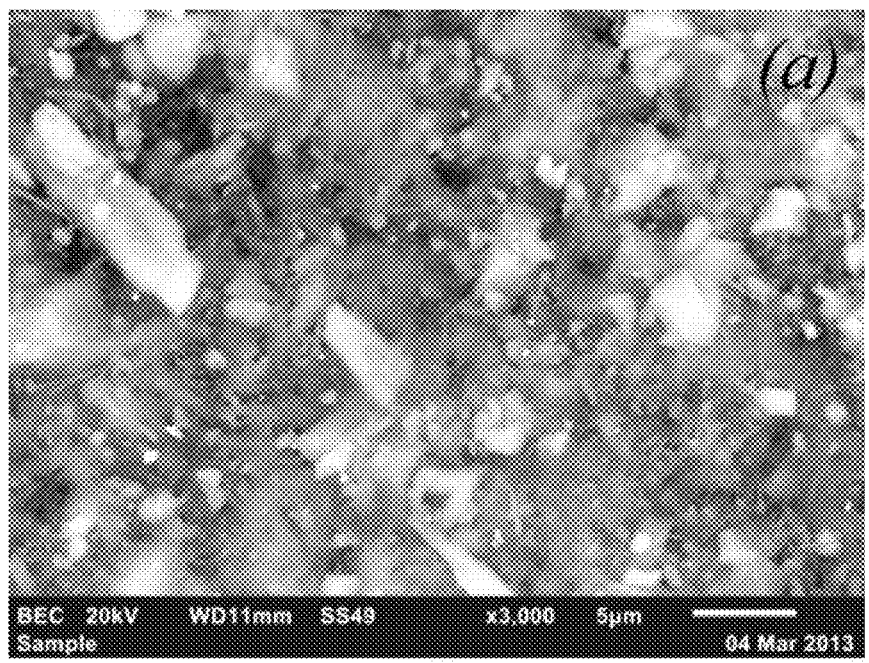
FIG. 4A is a backscattering electron image of one embodiment of the invention.
FIG. 4B is an energy-dispersive X-ray spectroscopy compositional map of one embodiment of the invention showing distribution of potassium (light grey color) along the bulk material.
Figure 4:

In addition to X-Ray diffraction data, formation of amorphous K(Na)-A-S—H gel in the Material #1 due to the hydrothermal treatment was confirmed by transmission-electron microscopy, and the images are shown in FIG. 2. Scanning electron microscopy reveals the microstructure of Material #1 at submicron-/micron scale (Example 1, depicted in FIGS. 3a-3d). The coexistence of amorphous gel along with tiny crystals of tobermorite and residual crystalline K-feldspar in Material #1 is illustrated by secondary electron images of high resolution (FIGS. 2a-2d). Compositional EDX mapping of Material #1 (Example 1) shows the distribution of potassium (K shown with light grey color) in the bulk material (FIG. 4).

Cumulative release of potassium for the Material #1 and Material #2 described above is illustrated by histograms and FIGS. 5a-5b. The dynamic of instant release of potassium is plotted in FIG. 6.

Figure 5:
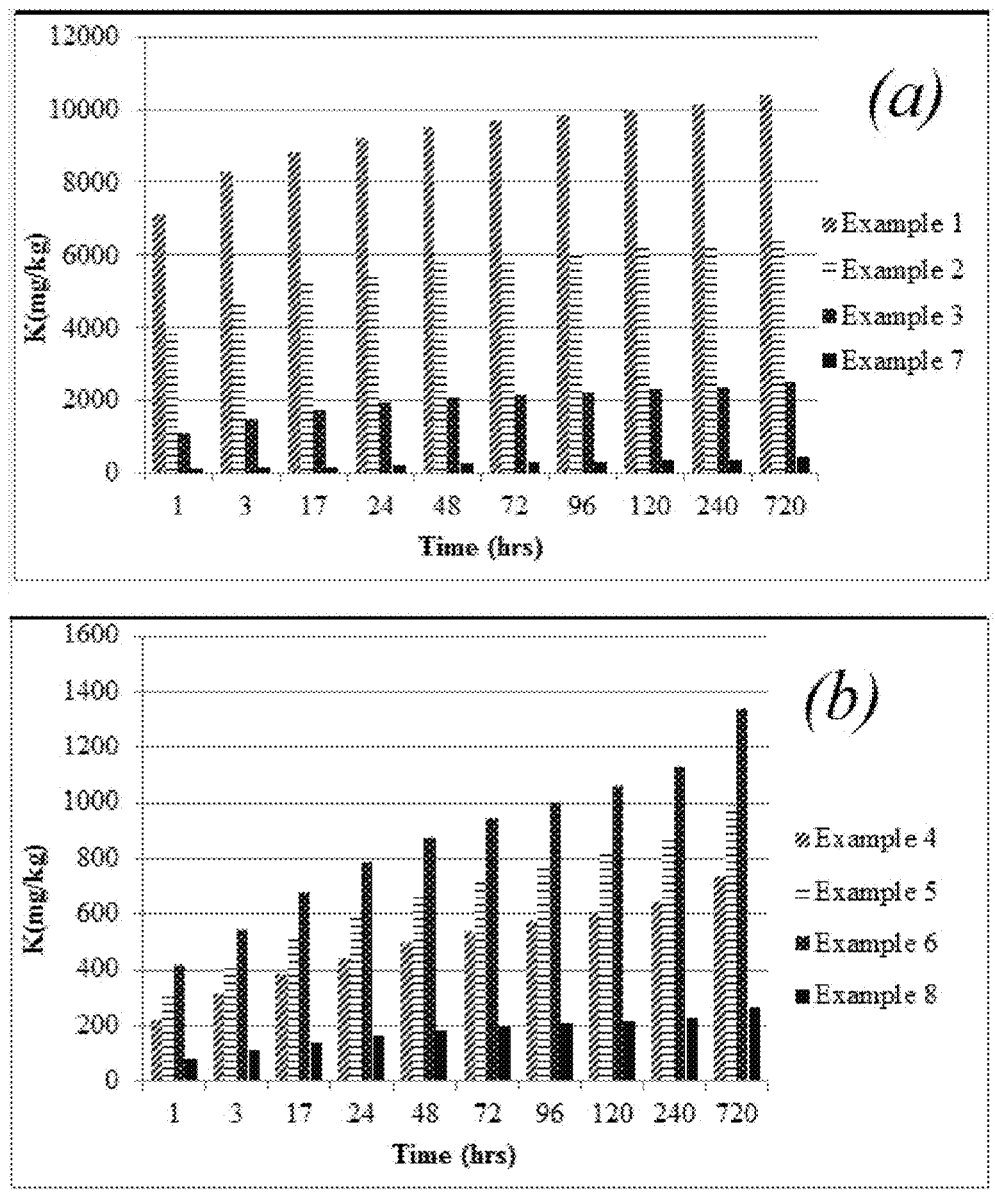
FIGS. 5A-5B are representations of the dynamic of cumulative release rates of potassium (K) from embodiments of the invention described below, and a comparison of those rates to control samples, also described below.
Figure 6:
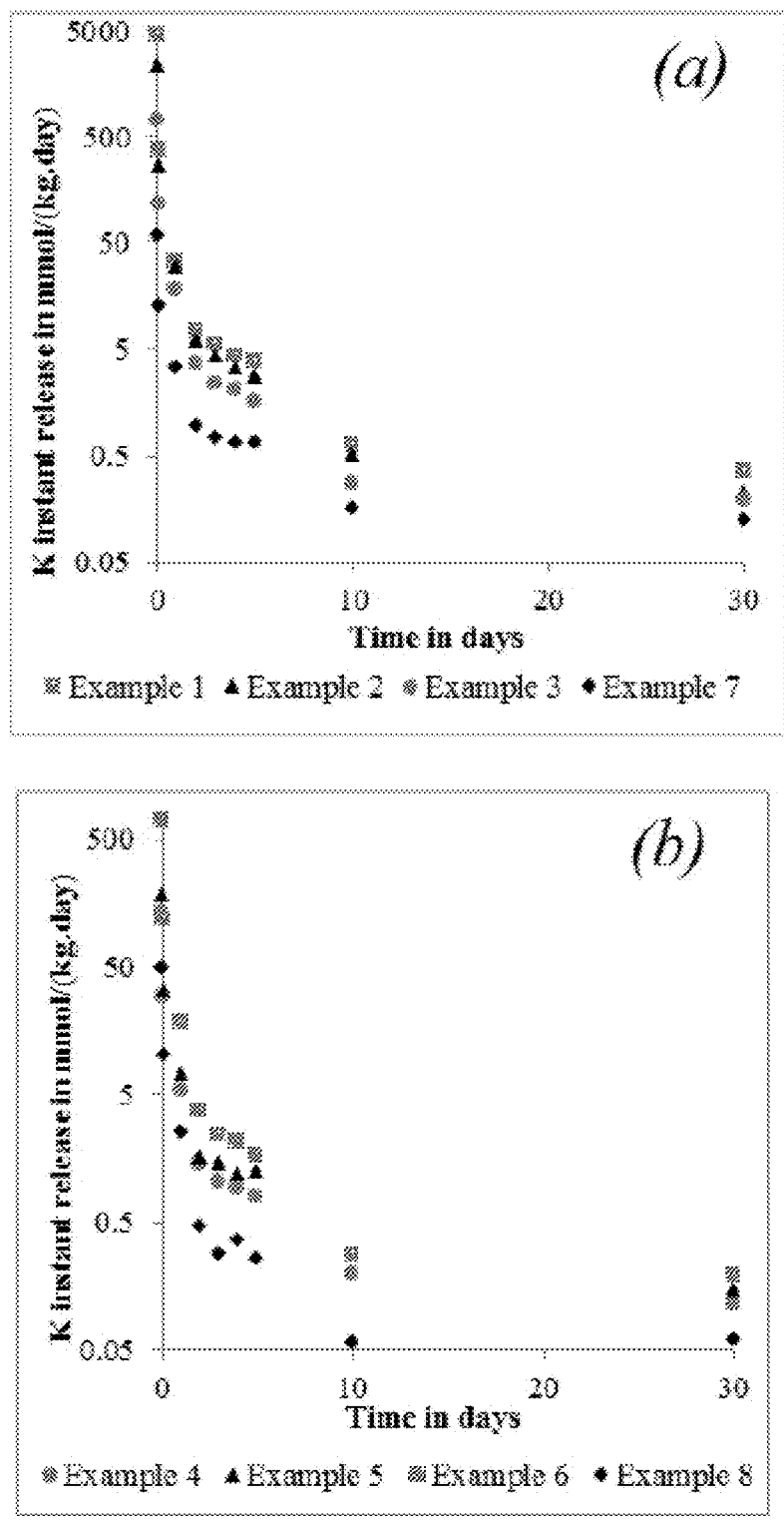
FIGS. 6A and 6B represent instant rates of release of potassium from embodiments of the invention described below, and a comparison of those rates to control samples, also discussed below.

At pH≤5 and ambient temperatures and pressure, both Material #1 and Material #2 release $K^+$ and other ions by two major chemical mechanisms: ion-exchange onto the material-fluid interface and hydrolysis of Al—O—Si and Si—O—Si bonds. As can be seen in FIGS. 5 and 6, initial dissolution is highly undersaturated in respect to $K^+$ influent results in fast and substantial release within 24 hours both for the Material #1 and Material #2. Subsequent release is limited by the rate of hydrolysis, which is substantially slower than initial ion-exchange.

Available specific surface area (SSA-BET), concentration of the amorphous part (the parameter is relevant to Material #1 only and expressed as wt. % of K(Na)-A-S—H gel, see Table II) and surface concentration of imperfections at sub-nanometer scale (the parameter is relevant both to Material #1 and Material #2 and estimated by micropore T-Plot Area, see Table II) contribute to the control of the dynamics of K-release. As can be seen from FIG. 5*a* for the Material #1, the higher the SSA, concentration of the amorphous part (gel), and the area of micropores (T-plot area), the higher the rate of release of $K^+$. For instance: Material #1 of the Example 1 is characterized by the highest gel content, SSA-BET, and T-Plot area; therefore, it demonstrates the highest (24-fold increase in respect to control sample 7). Example 2 is in the middle both in terms of the material properties described above and K-release (13-fold increase in respect to control sample 7). Material #1 of the Example 3 also follows this trend and has the lowest (5-fold) increase. The weight ratio between Tobermorite/(Microcline+Orthoclase), in turn, contributes to the amount of Ca, rapidly available: the higher this ratio, the lower the availability of Ca due to its fixation within the crystalline structure of tobermorite.

For the Material #2, the SSA-BET, micropore area and the volume concentration of micron-sized particles contribute to the dynamics of ions release. Other parameters being the same, the materials of Examples 4, 5, and 6 show 2-fold, 3-fold and 4-fold increase in K-release with respect to control sample 8, respectively. Comparing the K-release performance of Material #1 and Material #2, it is reasonable to conclude that, in general, the effect of sole mechanical treatment is significantly lower than that of mechano-chemical one.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method for forming an alkali metal ion source with a moderate rate of the ion release, comprising the steps of:
   a) combining a first component particulate alkali metal ion-bearing framework silicate with a second component that includes at least one of an oxide and a hydroxide of at least one of an alkaline earth metal and an alkali metal to form a solid mixture, wherein the molar ratio of the silicon to the at least one of the alkaline earth metal and alkali metal of the second component in the solid mixture is in a range of between about 1.0:0.1 and about 1.0:0.3; and
   b) exposing the solid mixture to a hydrothermal treatment to form a gel that includes the silicon and the alkali metal of the first component, thereby forming the source of alkali metal ion.

2. The method of claim 1, wherein the alkali metal of the first component includes at least one member of the group consisting of lithium, sodium and potassium.

3. The method of claim 2, wherein the alkali metal of the first component includes potassium.

4. The method of claim 3, wherein the particulate alkali metal ion-bearing framework silicate is an aluminosilicate.

5. The method of claim 4, wherein the alkali metal ion-bearing framework aluminosilicate includes at least one member selected from the group consisting of potassium feldspar ($KAlSi_3O_8$), leucite ($KAlSi_2O_6$), kalsilite ($KAlSiO_4$) and nepheline ($Na_3KAl_4Si_4O_{16}$).

6. The method of claim 4, wherein the first component includes at least about 5% by weight of an equivalent amount of $K_2O$.

7. The method of claim 1, wherein the second component includes an alkali metal.

8. The method of claim 7, wherein the alkali metal of the second component includes at least one member of the group consisting of lithium (Li), sodium (Na), and potassium (K).

9. The method of claim 1, wherein the second component includes an alkaline earth metal.

10. The method of claim 9, wherein the alkaline earth metal of the second component includes at least one member of the group consisting of beryllium (Be), magnesium (Mg), calcium (Ca), strontium (Sr).

11. The method of claim 10, wherein the alkaline earth metal of the second component includes calcium (Ca).

12. The method of claim 11, wherein the calcium of the second component is in the form of calcium hydroxide ($Ca(OH)_2$).

13. The method of claim 12, wherein the amount of calcium hydroxide is present in the combined solid mixture in a range of between about 5% and about 30% by weight.

14. The method of claim 1, further including the step of combining the mixture with liquid water to form a liquid-and-solid mixture prior to hydrothermal treatment.

15. The method of claim 14, wherein the amount of liquid present in the liquid-and-solid mixture is in a weight ratio of liquid-to-solid in a range of between about 0.05:1 and about 5:1.

16. The method of claim 15, further including the step of milling the solid mixture to thereby reduce the mean particle size of the first component until the volume percent of said particles having a diameter of 5 μm or less is at least about 30%.

17. The method of claim 16, further including the step of milling the solid mixture to thereby reduce the mean particle size of the first component until the volume percent of said particles having a diameter of 5 μm or less is at least about 50%.

18. The method of claim 16, wherein the liquid water is added before the milling step.

19. The method of claim 16, wherein the liquid water is added after the milling step.

20. The method of claim 16, wherein the hydrothermal treatment includes exposing the liquid-and-solid mixture to a temperature in a range of between about 100° C. and about 350° C. for a period of time sufficient enough to form the gel that includes the silica and alkali metal of the first component in the amount not less than 10 wt. %.

21. The method of claim 20, wherein the alkali metal of the first component is potassium.

22. The method of claim 16, wherein the hydrothermal treatment includes exposing the solid mixture to a pressure of between about 100 psig and about 500 psig during at least a portion of the period of time the mixture is exposed to a temperature of between about 100° C. and about 350° C. to thereby form the silicate gel.

23. The method of claim 22, further including the step of forming the first component by reducing the particles size to a particle size of equal to or less than about 5 mm.

24. The method of claim 23, further including the step of combining the alkali metal ion source with soil.

25. The method of claim 1, wherein the solid mixture is exposed to the elevated temperature and pressure until essentially all of the alkaline earth metal of the first component is present as a component of the gel.

26. The method of claim 1, wherein the weight ratio of tobermorite phase to the unreacted alkali metal ion-bearing framework silicate phases of the alkali metal ion source is between about 1:1 and about 0:1.

27. The method of claim 1, wherein the weight percent of K(Na)-A-S—H gel of the alkali metal ion source is between about 10% and about 100%.

28. The method of claim 1, wherein the specific surface area of the alkali metal ion source is between about 8 $m^2$/g and 50 $m^2$/g.

29. An alkali metal ion source with a moderate rate of ion release, formed by a method comprising the steps of:

a) combining a first component particulate alkali metal ion-bearing framework silicate with a second component that includes at least one of an oxide and a hydroxide of at least one of an alkaline earth metal and an alkali metal to form a solid mixture, wherein the molar ratio of the silicon to the at least one of the alkaline earth metal and alkali metal of the second component is in a range of between about 1.0:0.1 and about 1.0:0.3; and b) exposing the solid mixture to a hydrothermal treatment to form a gel that includes the silica and the alkali metal of the first component, thereby forming the alkali metal ion source, comprised of the alkali metal ion bearing silicate gel in amount of not less than 10 wt. %, wherein the alkali metal ion source has a specific surface area (BET) between about 8 $m^2$/g and about 50 $m^2$/g, wherein the alkali metal ion source releases not less than 1 g of potassium per 1 kg of the alkali metal ion source and not less than 1 wt. % of silica acid within 24 hours upon exposure to aqueous solution that is undersaturated with respect to potassium and silica.

* * * * *